D. JOSEPH.
CHECK HOLDER FOR AUTOMOBILE DRIVERS.
APPLICATION FILED OCT. 23, 1913.
1,113,016.
Patented Oct. 6, 1914.
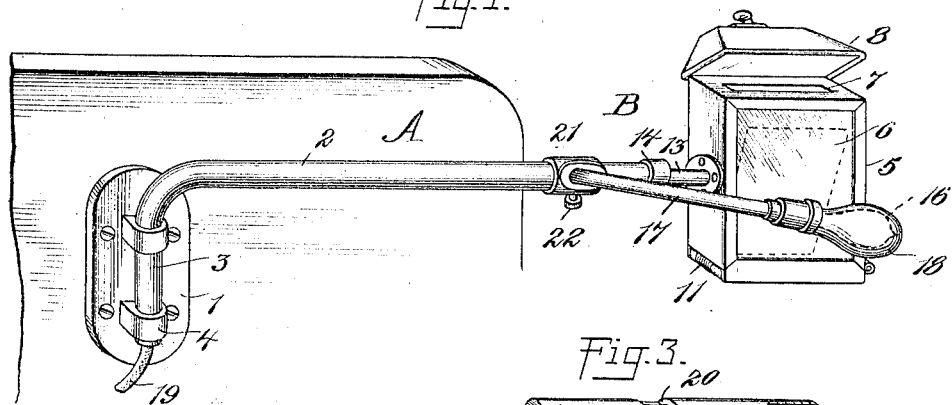
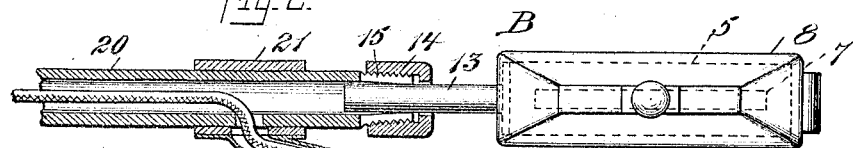
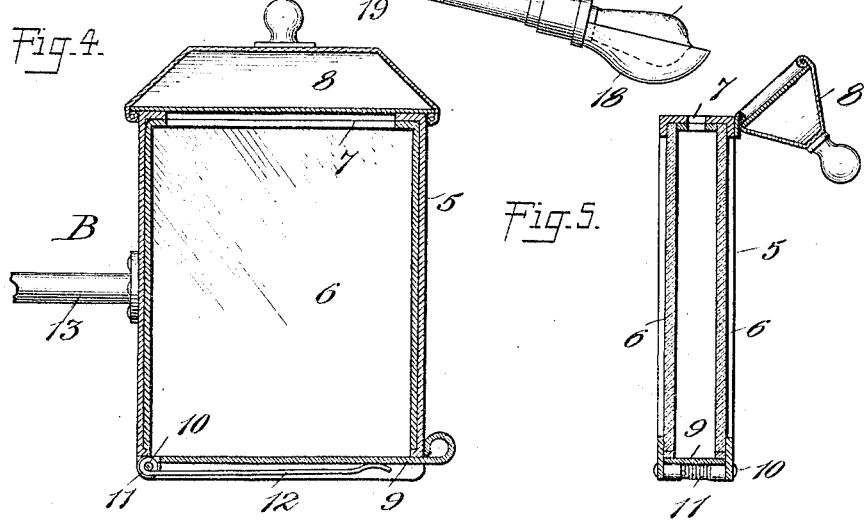
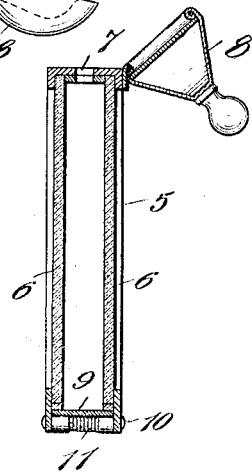
WITNESSES
George L Blume
E P Bradway
INVENTOR
Daniel Joseph
BY Munn Co.
ATTORNEYS

UNITED STATES PATENT OFFICE.

DANIEL JOSEPH, OF NEW YORK, N. Y.

CHECK-HOLDER FOR AUTOMOBILE-DRIVERS.

1,113,016.  Specification of Letters Patent.  Patented Oct. 6, 1914.

Application filed October 23, 1913. Serial No. 796,842.

*To all whom it may concern:*

Be it known that I, DANIEL JOSEPH, a citizen of the United States, and a resident of the city of New York, borough of Manhattan, in the county and State of New York, have invented a new and Improved Check-Holder for Automobile - Drivers, of which the following is a full, clear, and exact description.

It is the usual custom at theaters, hotels, department stores and the like for an attendant to give to drivers of automobiles or other vehicles, and to the occupants thereof, number checks when the occupants leave the vehicle to enter the theater, hotel or department store, which checks are used to enable the attendant to call the proper automobiles for the patrons when the latter are ready to leave. The drivers often lose the checks or misplace them so that great inconvenience and annoyance results, as heretofore no means has been provided to hold the number checks, it being the usual practice to give the driver's check into the driver's hands.

It is the object of the present invention to provide a driver's check holder which is mounted on the automobile at a suitable position, as, for instance, the dashboard, so that the attendant at the hotel, theater or department store can deposit the driver's check into the holder, where it is always in view, and as it is not given into the possession of the driver there is no danger of its being lost. When the driver is signaled to return and take away the patron having the corresponding number check, the holder may then be opened by either the attendant or the driver. The check drops out and is then annulled.

Specifically the objects of the present invention are to provide a comparatively simple and inexpensive holder which can be readily attached to automobiles, and embodies a weather-proof casing which is glazed at the front and rear so that the number checks will be readily exposed, there being a light arranged adjacent the holder so as to illuminate the check therein at night. The check holder is so designed as to be readily attached to either side of the dashboard as will be found most convenient.

With such objects in view and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views, Figure 1 is a perspective view showing the attachment applied to a dashboard; Fig. 2 is a plan view, partially in section, showing the manner of mounting the ticket holder and lamp on the supporting arm; Fig. 3 is a fragmentary view of the outer end of the supporting arm; and Figs. 4 and 5 are sectional views of the check holder taken at right-angles to each other.

Referring to the drawing, A designates the dashboard of an automobile or other vehicle on which the driver's check holder attachment B is mounted, but it is to be understood that the attachment can be arranged on any other suitable part of the vehicle. The attachment comprises a bracket 1 of any suitable construction that carries the supporting arm 2 which may be of any desired construction, such arm being L-shaped and having a vertical member 3 journaled in lugs 4 on the bracket 1. By means of this manner of connecting the supporting arm of the bracket the attachment can be mounted on the right or left hand end of the dashboard with equal facility.

The check holder, which is carried on the outer end of the supporting arm 2, is a rectangular casing 5 of any suitable construction having its front and rear sides open but covered with glass, celluloid or other transparent plates 6, so that whenever a driver's check is contained in the holder it can be readily seen. The top of the casing 5 has a slot 7 through which the check is deposited, and a hinged cover 8 normally closes the slot so as to protect the check from the weather. At the bottom of the casing is a trap door 9 hinged to swing on a shaft or pivot 10, there being a spring 11 on this shaft which has an arm 12 disposed under the door 9 so as to yieldingly hold the latter raised or in closed position. On the outer end of the door is a knob or fingerhold which is engaged to press the door downwardly to open position against the tension of the spring, whereby the check will drop out from the casing. The ticket holder may be attached to the arm 2 in any suitable manner, as, for instance, by being formed with a laterally-projecting lug 13 which extends into the outer end of the tubular arm 2, such outer end being provided with a clamping ring 14 which screws in place and clamps the parts together, as the outer end of the arm 2 may be split, as shown in Fig. 3, to form clamping jaws 15. In order to enable the check to be easily seen by night an illuminating device is provided, the same consisting of an electric lamp 16 which is mounted on a stem 17 which is carried by the outer end of the arm 2, and on this stem 17 is a shade 18 so that the light of the lamp will not enter the eyes of the driver. The wires 19 for the incandescent lamp pass through the stem 17 and enter the arm 2 through an opening 20 in the latter, and these wires pass through the arm and out of the inner end thereof and lead to a suitable source of current carried by the vehicle. In order that the attachment may be reversible, that is to say, mounted on either end of the dashboard, the lamp and its support are mounted on the arm 2 in such a manner as to turn through 180°, and for this purpose the inner end of the stem or bracket 17 is in the form of a ring 21 which is clamped to the arm 2 in any suitable manner, as for instance, by a set-screw 22. By loosening such screw the lamp-carrying bracket or support can be shifted so as to light the side of the check holder which is presented to the driver. After the attachment is once fastened to one end of the dashboard it is not necessary to shift the adjustment of the lamp, as it is intended always to remain at the side of the check holder which is seen by the driver.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made when desired as are within the scope of the appended claims.

Having thus described my invention, I claim as new and desire to secure by Letters Patent:

1. A driver's check holding device comprising an arm, a ticket receptacle thereon, and a lamp-carrying arm carried by the first-mentioned arm and movable thereon for adjustment to either side of the said receptacle, said receptacle being transparent on both sides.

2. A driver's check holding device comprising an arm, a ticket receptacle thereon, a lamp-carrying arm carried by the first-mentioned arm and movable thereon for adjustment to either side of the said receptacle, said receptacle being transparent on both sides, said arms being hollow, electric conductors passing therethrough, and a lamp on the second-mentioned arm.

3. The combination of a vehicle dash, a bracket thereon, an arm mounted on the bracket and extending beyond one of the side edges of the dash, a ticket-holding receptacle on the outer end of the arm and being transparent on both sides, said receptacle being disposed at a point outwardly from the side of the dash, and means on the arm and exterior to the receptacle to illuminate the latter.

In testimony whereof I have signed my name to this specification in the presence of two subscribing witnesses.

DANIEL JOSEPH.

Witnesses:
 CHATTEN BRADWAY,
 PHILIP D. ROLLHAUS.